April 19, 1949.  L. R. O'NEILL  2,467,628
WELDING APPARATUS
Filed Oct. 11, 1948

INVENTOR.
Louis R. O'Neill.
BY W. B. Harpman
ATTORNEY.

Patented Apr. 19, 1949

2,467,628

UNITED STATES PATENT OFFICE 2,467,628

WELDING APPARATUS

Louis R. O'Neill, Warren, Ohio

Application October 11, 1948, Serial No. 53,831

7 Claims. (Cl. 219—4)

This invention relates to welding apparatus and more particularly to electric resistance welding apparatus of the spot welding type.

The principal object of the invention is the provision of an improved spot welding apparatus of the portable type.

A further object of the invention is the provision of a portable spot welding apparatus including structure arranged to maintain the electrodes thereof in positive alignment with one another.

A still further object of the invention is the provision of a portable welding apparatus of a simple lightweight form capable of relatively easy fabrication and assembly.

A still further object of the invention is the provision of welding apparatus of the resistance type having means for alternately mounting various lengths of electrode carrying arms so that the apparatus may be adapted for various workpiece applications.

The portable electric resistance welding apparatus disclosed herein comprises a device incorporating means for applying forging pressure to workpieces to be welded and at the same time provides for the direction of an appropriate electrical current through the workpieces so that a satisfactory weld is made.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein.

Figure 1:
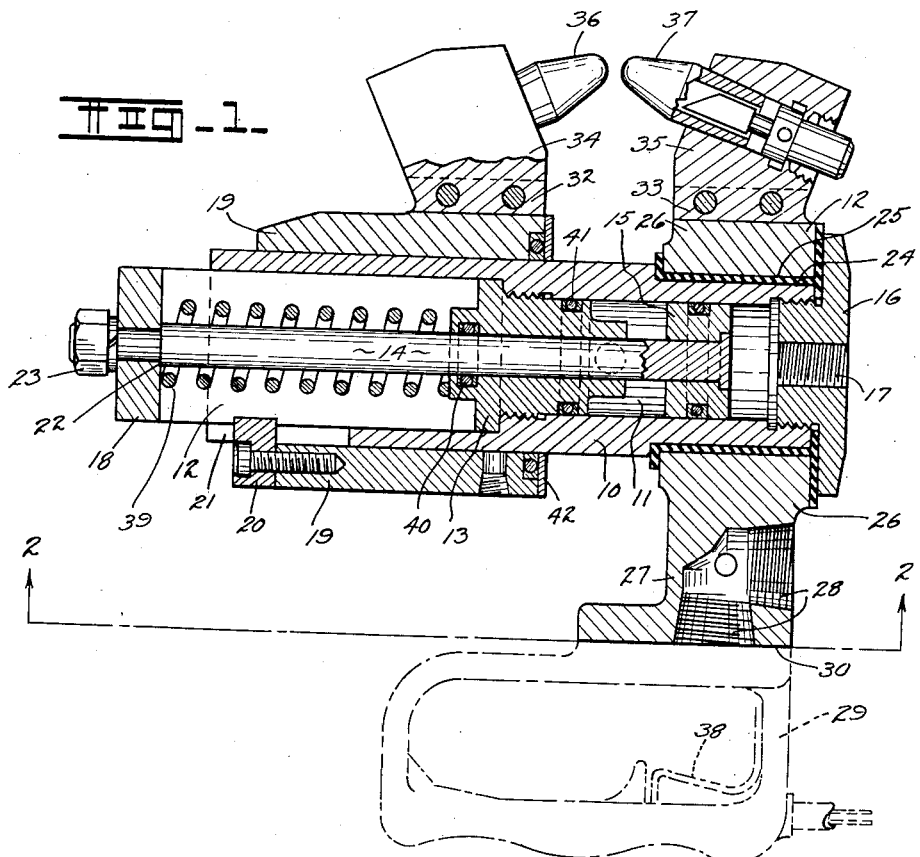
Figure 1 is a cross sectional side elevation of the portable welding apparatus.

By referring to the drawing and Figure 1 in particular it will be seen that the electric welding apparatus comprises an assembly of simply machined and assembled parts including a cylindrical body member 10 formed of suitable material such as 18-8 stainless steel having a chamber 11 in one end thereof and a secondary chamber 12 in the other end thereof. It will be observed that the chamber 11 is of smaller diameter than the chamber 12 and that the chambers 11 and 12 are separated from one another by a plug 13 threadably engaging a thread pattern formed in the cylindrical body member 10 and inwardly from the ends thereof. The plug 13 is drilled axially to form a passageway for a piston rod 14.

A piston head 15 is formed on one end of the piston rod 14 and registers in the chamber 11. The piston and piston rod are formed of suitable material such as 18-8 stainless steel. A cap 16 threadably engages the end of the cylindrical body member 10 to form a closure for the chamber 11 and is provided with a drilled and tapped orifice 17 through which fluid pressure is adapted to be delivered to the device for actuating the same. The other end of the piston rod 14 extends outwardly and beyond the other end of the cylindrical body member 10 where it is secured to a yoke-like extension 18 of a sleeve-like member 19 formed of non-magnetic material. The inner diameter of the sleeve-like member 19 corresponds with the outer diameter of the cylindrical body member 10 with appropriate mechanical clearance so that the sleeve-like member 19 can slide back and forth on the cylindrical body member 10. A key 20 is attached to a portion of the sleeve-like member 19 and registers with a longitudinally extending slot 21 formed in the cylindrical body member 10 and in the end thereof defining the chamber 12 as heretofore referred to. The connection between the outer end of the piston rod 14 and the yoke-like extension 18 of the sleeve-like member 19 comprises a shoulder 22 formed on the piston rod for registry with the inner surface of the yoke 18. The outer end of the piston rod 14 is threaded and a fastener such as a nut 23 is secured thereto against the outer face of the yoke 18. It will thus be seen that any motion on the part of the piston 15 and the piston rod 14 will be imparted to the yoke 18 which in turn will move the sleeve-like member 19 longitudinally on the cylindrical body member 10. The other end of the cylindrical body member 10 has an annular section 24 of reduced diameter for the reception of an insulating bushing 25 and a frame member 26 which is preferably formed of non-magnetic material and in the manner of a C clamp so that it can be tightened into position on the cylindrical body member 10 and electrically separated therefrom by the insulating bushing 25.

The frame member 26 has a sideward extension 27 which in turn has drilled and tapped orifices 28 therein by means of which one end of a flexible electrical conductor (not shown) may be connected thereto. A handle 29, shown in dotted lines in Figure 1 of the drawings, may be alternately secured to the outer face 30 of the extension 27 or to the side thereof in which the orifice 28 is formed, as desired, so that the welding apparatus may be conveniently manipulated thereby. The sleeve-like member 19 is also provided with drilled and tapped orifices 19' similar to the orifices 28 heretofore referred to so that a secondary electrical conductor may be connected thereto and a welding circuit established between the welding apparatus and a suitable source of electrical current.

Figure 2:
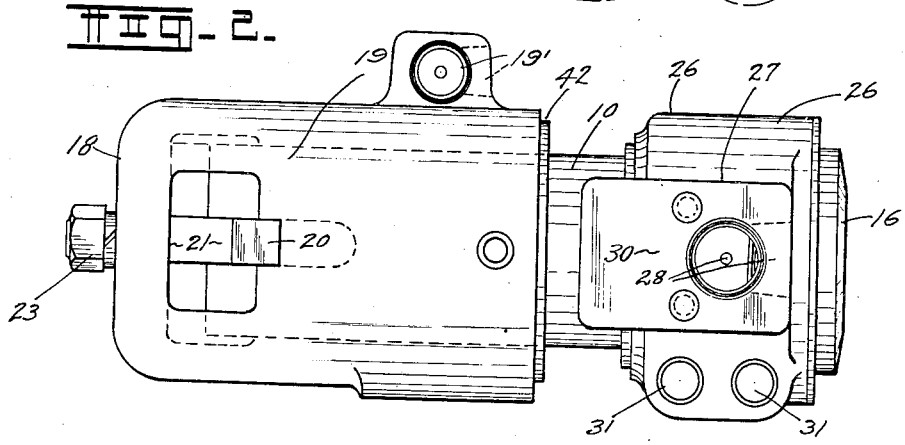
Figure 2 is a plan view on line 2—2 of Figure 1.

The means for clamping the frame member 26 in location on the cylindrical body member 10 may comprise bolt and nut assemblies 31 as illustrated in Figure 2 of the drawings and which engage the spaced portions of the C-like frame member 26 so that the inner diameter thereof may be reduced by tightening the bolt and nut assemblies 31. The sleeve-like member 19 and the frame member 26 have oppositely disposed, aligned extensions 32 and 33, respectively, slotted portions of which comprise means for the detachable connection of a pair of oppositely disposed, aligned, electrode carrying arms 34 and 35, respectively. In Figure 1 of the drawings the arms 34 and 35 are shown to be relatively short and to carry electrodes 36 and 37 in a conventional manner.

It will be obvious to those skilled in the art that the length and configuration of the arms 34 and 35 may be changed from that illustrated herein, for example, so that they are considerably longer and thereby capable of engaging workpieces to be welded at a greater distance from the cylindrical body member 10 than that illustrated herein. The electrodes 36 and 37 are adapted for the circulation of a coolant therethrough as is also customary in the art. The handle 29 is provided with a trigger 38 for the remote actuation of controlling devices (not shown) as known in the art by means of which hydraulic pressure may be introduced into the orifice 17 as by way of a suitable connecting flexible tube and by means of which a welding current may be connected to the sleeve member 19 and its electrode 36 and the frame 26 and its electrode 37 to the end that a satisfactory resistance welding operation may be performed.

It will thus be seen that a portable welding apparatus of the electric resistance type has been disclosed which comprises a simply formed and assembled structure and which possesses certain inherent advantages and particularly with respect to the maintenance of the electrodes 36 and 37 in predetermined desirable alignment with one another. As is known in the art, one of the common objections in portable electric resistance type welders has been the inability to maintain alignment between the electrodes and/or their sideward movement with respect to workpieces positioned therebetween during the times when forging pressures are applied to the workpiece through the electrodes.

It will occur to those skilled in the art that the cylindrical body member 10 provides an unusually sturdy base for the mounting of the sleeve-like member 19 and the frame member 26 which in turn carry the electrodes 36 and 37. The mounting of the sleeve-like member 19 on the cylindrical body member 10 contributes to the inherent rigidity of the structure and its ability to resist any tendency towards buckling or bending which would permit the electrodes 36 and 37 to move out of predetermined alignment.

By again referring to Figure 1 of the drawings it will be seen that a coil spring 39 is disposed about the piston rod 14 and between the inner surface of the yoke 18 and the plug 13 so as to normally bias the yoke 18 outwardly with respect to the cylindrical body member 10. In connection with the plug 13 it will be observed that glands are provided between the plug body and the rod 14, as indicated by the numeral 40, and between the plug body and the chamber 11 as indicated by the numeral 41. A wiper 42 is mounted on the sleeve-like member 19 for maintaining the exterior surface of the cylindrical body member 10 in suitable condition for the reciprocal travel of the sleeve-like body member 19.

It will thus be seen that a simple and efficient portable electric resistance apparatus has been disclosed which meets the several objects of the invention.

Having thus described my invention, what I claim is:

1. An electric resistance welding apparatus of the type in which the apparatus serves as a means for applying pressure to the parts to be welded and including a body member having a chamber formed therein, means for introducing fluid pressure into said chamber, a piston in said chamber having a rod connected thereto and extending outwardly of the said body member, a secondary body member of current conducting material positioned around the exterior of the first mentioned body member for reciprocal movement thereon and connected to the said piston rod for movement thereby, a frame formed of current conducting material positioned on the said body member and insulated therefrom, and means on the said secondary body member and on the said frame in oppositely disposed aligned relation for receiving welding electrodes.

2. An electric resistance welding apparatus of the type in which the apparatus serves as a means for applying pressure to the parts to be welded and including a cylindrical body member having a chamber formed therein, means for introducing fluid pressure into said chamber, a piston in said chamber having a rod connected thereto and extending outwardly of the said body member, a sleeve-like member of current conducting material positioned on the exterior of the cylindrical body member for reciprocal movement thereon and connected to the said piston rod for movement thereby, a frame formed of current conducting material positioned on the said cylindrical body member and insulated therefrom, and means on the said sleeve-like member and on the said frame in oppositely disposed aligned relation for receiving welding electrodes.

3. An electric resistance welding apparatus of the type in which the apparatus serves as a means for applying pressure to the parts to be welded and including a cylindrical body member having a chamber formed therein, means for introducing fluid pressure into said chamber, a piston in said chamber having a rod connected thereto and extending outwardly of the said body member, a sleeve-like member of current conducting material positioned on the exterior of the cylindrical body member for reciprocal movement thereon and connected to the said piston rod for movement thereby, a frame formed of current conducting material positioned on the said cylindrical body member and insulated therefrom, means on the said sleeve-like member and on the said frame in oppositely disposed aligned relation for receiving welding electrodes, and spring means normally urging the said sleeve-like member away from the said frame.

4. An electric resistance welding apparatus of the type in which the apparatus serves as a means for applying pressure to the parts to be welded and including a tubular body member having a cylindrical chamber formed in one end thereof, means for directing fluid pressure into the said cylindrical member and a piston reciprocally mounted in said chamber, a portion of the said piston extending outwardly of the said tubular body member, a sleeve-like member slidably mounted on the exterior of the said tubular body member, a yoke on said sleeve-like member spanning one end of the said tubular body member, the said piston rod being connected to the said yoke, fluid sealing means located inwardly of the ends of the said tubular body member and forming a seal between the said piston rod and the said tubular body member, a circular frame mounted on the said body member and insulated with respect thereto and spaced with respect to the said sleeve-like member and means on the said sleeve-like member and on the said circular frame for receiving welding electrodes.

5. An electric resistance welding apparatus of the type in which the apparatus serves as a means for applying pressure to the parts to be welded and including a tubular body member having a cylindrical chamber formed in one end thereof, means for directing fluid pressure into the said cylindrical member and a piston reciprocally mounted in said chamber, a portion of the said piston extending outwardly of the said tubular body member, a sleeve-like member slidably mounted on the exterior of the said tubular body member, a yoke on said sleeve-like member spanning one end of the said tubular body member, the said piston rod being connected to the said yoke, fluid sealing means located inwardly of the ends of the said tubular body member and forming a seal between the said piston rod and the said tubular body member, a circular frame mounted on the said body member and insulated with respect thereto and spaced with respect to the said sleeve-like member and means on the said sleeve-like member and on the said circular frame for receiving welding electrodes, and spring means normally maintaining the electrodes.

6. A portable electric welding apparatus comprising a pair of welding electrodes to engage the material being welded, one of the electrodes being fixed and the other electrode movable toward and away from the said fixed electrode, means normally supporting the fixed electrode and enclosing a fluid pressure cylinder, a piston in said cylinder mechanically connected with the said movable electrode and adapted to apply welding pressure to the material being welded, the said support means for the fixed electrode including a tubular extension and the said movable electrode including an annulus slidably engaging the said tubular extension of the fixed support.

7. An electric resistance welding apparatus of the type in which the apparatus serves as a means for applying pressure to the parts to be welded and including a cylindrical body member having a chamber formed therein, means for introducing fluid pressure into said chamber, a piston in said chamber having a rod connected thereto and extending outwardly of the said body member, a sleeve-like member of current conducting material positioned on the exterior of the cylindrical body member for reciprocal movement thereon and connected to the said piston rod for movement thereby, a frame formed of current conducting material positioned on the said cylindrical body member and insulated therefrom, means on the said sleeve-like member and on the said frame in oppositely disposed aligned relation for receiving welding electrodes, and a key and keyway formed on the sleeve-like member and the cylindrical body member, respectively, for maintaining the electrode receiving means in oppositely disposed relation.

LOUIS R. O'NEILL.

REFERENCES CITED

The following references are of record in the file of this patent:

UNITED STATES PATENTS

| Number | Name | Date |
| --- | --- | --- |
| 2,293,338 | Harris | Aug. 18, 1942 |